Patented May 29, 1951

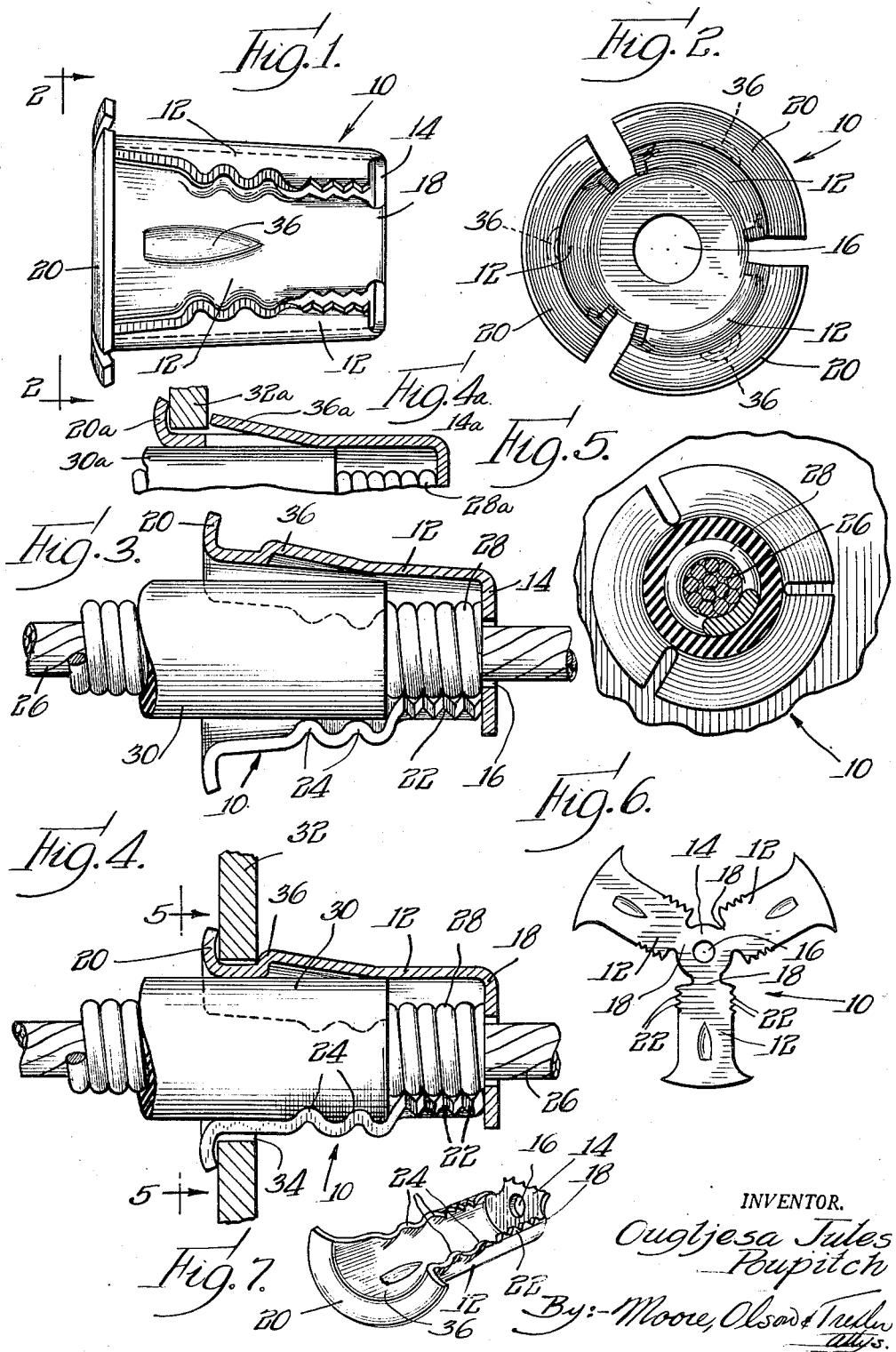

2,555,292

UNITED STATES PATENT OFFICE 2,555,292

FASTENER

Ougljesa Jules Poupitch, Chicago, Ill., assignor to Illinois Tool Works, Chicago, Ill., a corporation of Illinois Application December 12, 1947, Serial No. 791,382

4 Claims. (Cl. 85—36)

This invention relates generally to fasteners, and more particularly to fasteners or clips of the sheet metal type adapted to be snapped into the aperture of a work piece and in this position to support an elongated part, such as a cable or other similar cylindrical member.

Steel cables are often shifted within metallic sheathing, and this presents the problem of properly supporting the sheathing in fixed position. For example, in automobiles and trucks cables are often employed to effect the actuation of brakes, and this necessitates having the shiftable cable extend through the brake housing. The sheathing in which the cable is adapted to reciprocate must also be fixed to the housing, and the present invention contemplates a fastener which is particularly well adapted to secure cable sheathing and the like within a work piece as, for example, within the wall structure of the aforesaid brake housing. In fact, the present invention contemplates a fastener for the purpose just referred to, which is designed to snugly encircle the outer periphery of the cable sheathing or similar structure, to permit the fastener and sheathing to be snapped into locked position within the aperture of the work piece, and to assure free longitudinal movement of the cable within the sheathing.

More specifically, it is an object of the present invention to provide a sheet metal fastener of the type referred to above which is not only adapted to snugly encircle the periphery of a cylindrical body, such as a cable sheath, but which is equipped with means for drawing the cylindrical part fully into the fastener prior to the insertion of the fastener within the work aperture.

It is a further object of the present invention to provide a sheet metal fastener as referred to above, which may be produced by the practice of economical stamping and forming methods and which is provided with a longitudinal body portion adapted to resiliently impinge the periphery of the part to be supported.

The foregoing and other objects and advantages will be more apparent from the following detailed description when considered in connection with the accompanying drawing, wherein—

Fig. 1 is a side elevational view of a sheet metal fastener or clip embodying features of the present invention;

Fig. 2 is an end view of the fastener shown in Fig. 1, said view being taken from the left of Fig. 1, as indicated by the section lines 2—2;

Fig. 3 discloses the fastener of Fig. 1 in longitudinal central section associated with a cable and sheathing structure prior to the insertion of the fastener and cable structure into the aperture of a work piece;

Fig. 4 is a view similar to Fig. 3 disclosing the fastener and associated cable structure snapped into final position within an apertured work piece, such as the wall of a brake housing;

Fig. 4a is a fragmentary view similar to Fig. 4 showing a modified form of the invention;

Fig. 5 is an end elevational view of the fastener similar to the view shown in Fig. 2 after the fastener has been applied to the cable structure, said view being taken substantially along the line 5—5 of Fig. 4;

Fig. 6 discloses a blank of sheet metal which, when subsequently folded and formed so as to longitudinally position the cable encircling segments, will provide the fastener shown in Figs. 1 and 2; and Fig. 7 is a fragmentary perspective view showing one of the circumferential segments, the other two segments being broken away for the purpose of more clearly disclosing structure otherwise hidden.

Referring to the drawing more in detail, wherein like numerals have been employed to designate similar parts throughout the various figures, it will be seen that the present invention contemplates a sheet metal fastener or clip designated generally by the numeral 10. The sheet metal fastener 10 includes a plurality of longitudinal segments 12 of arcuate cross-section. These segments or sections 12 are positioned in substantial circumferential alignment and are connected at their entering extremity by a connecting portion or annulus 14 which is provided with a central cable accommodating aperture 16. It will be seen from Fig. 6 that the segments 12 and their connecting annuli 14 may be produced from flat sheet stock by first providing a blank, as illustrated in this figure. The portion of each segment 12 which connects with the annulus 14 is of reduced cross-section so as to provide a neck portion 18. The stock of the segments 12 is subsequently formed into arcuate cross-section and then bent at the neck portions 18 so as to occupy the positions illustrated in Figs. 1 to 3, inclusive.

The free or outer extremity of each segment 12 is provided with a resilient flange or head portion 20, and opposite longitudinal margins of each segment 12 present thread engaging means or teeth 22 in the vicinity of the connecting means or annulus 14 and indentations or teeth 24 at a point closer to the head 20.

In Fig. 3 a flexible control member or cable 26 is shown which is adapted to be shifted longitudinally within a metallic sheath 28. One form of metallic sheathing consists of a single strand of wire closely coiled and providing an internal opening slightly larger than the external diameter of the cable. These coils are in effect helical convolutions in the nature of threads which are adapted to be received by and follow within complementary helical ways or paths defined by the thread engaging means or teeth 22. It is also common practice to employ a secondary sheath which encircles the metallic sheath 28, this secondary sheath being designated by the numeral 30. In the disclosed embodiment, the secondary sheath or covering 30 is formed of impressionable material such as rubber or neoprene, and the extremity of this covering 30 terminates short of the extremity of the inner sheath 28 a sufficient distance to permit operative association of the convolutions of the sheath 28 with the thread engaging teeth 22 of the fastener.

When the fastener is to be secured in position within a work piece as, for example, the work piece 32 shown in Fig. 4, the stranded cable 26 is first threaded through the fastener aperture 16, as shown in Fig. 3. It will be noted that the longitudinal segments 12 flare outwardly toward their headed end and thus permit free insertion of the cable sheaths 28 and 30. By rotating the fastener 10, the thread engaging means or teeth 22 interlock with the complementary convolutions of the wire sheathing 28 so as to bring the entering end of this sheathing into abutment with the connecting portion 14. This assures complete entrance of the sheaths within the fastener in proper position, subsequently to be gripped by the fastener.

The fastener and its associated cable structure is now ready for insertion within an aperture 34 of the work piece or brake housing 32, Fig. 4. The diameter of the aperture 34 is such as to cause the circumferentially aligned segments 12 to be forced radially inwardly, thereby causing the teeth 24 to be carried into locking impingement with the periphery of the secondary casing or covering 30, and the teeth 22 to be brought into firm impingement with the periphery of the sheathing 28. The fastener is inserted until the resilient head is brought into abutment with the outer surface of the work piece 32. In this position latching protuberances or shoulders 36 provide shoulders for engaging the opposite surface of the work piece 32, as clearly illustrated in Fig. 4. Thus the fastener and the sheaths 28 and 30 associated therewith are firmly secured in a fixed position within the housing, and the stranded actuating cable 26 is free to shift within the sheath 28.

From the foregoing it will be apparent that the present invention contemplates a fastener of extremely simple and practical construction which is particularly adapted to encircle and impinge cylindrical objects after threaded engagement has been established between the cylindrical object and the inner or entering portion of the fastener. In providing the thread engaging means toward the entering end of the fastener, the complete insertion of the cylindrical part is assured. While for purposes of illustration, this feature of the invention has been shown as applied to the art of fastening cable structures, it will be apparent that the invention is by no means limited to such embodiments. In fact, in any instance where it is desirable to assure complete insertion within the fastener structure of the part to be supported, the above described thread engaging means may be put to practical use. Also, the use of the teeth 24 for impinging the periphery of the supported part 39 is optional. In some instances it may be desirable to employ teeth or surface impinging areas of different shape or form. The teeth 24 are practical for use in relatively soft material, but other types of teeth or indentations may be more practical when a secondary sheathing of relatively hard stock such as metal is employed. It will also be understood that while the present invention discloses a member to be supported, such as a cable sheathing structure equipped with an externally threaded surface, the invention contemplates a fastener equipped with a thread portion or helices designed to engage a wide variety of peripheral surfaces. In the disclosed embodiment, these thread portions or helices are formed by bending inwardly a marginal portion of each segment 12 in the vicinity of the connecting annulus 14.

Obviously, other structural embodiments are contemplated which will serve the purpose of thread means or thread engaging means formed integral with the segments. It will also be understood that while the protuberances or dimples 36 are relatively rigid, the flexibility of the segments enables the inward flexing sufficiently to permit insertion of the fastener within the work aperture. Resilient fingers such as those shown at 36a in Fig. 4a providing shoulders for engaging the inner surface of the work piece 32 might also be employed. By having the head portion 20 resilient, the snugness with which the material defining the work aperture may be gripped by the fastener is considerably enhanced. In other words, by having the flange or head 20 somewhat resilient, the resilient gripping of the work piece between the shoulders provided by the protuberances 36 or fingers 36a and the inner surface of the head is facilitated.

For purposes of illustration one practical application of the fastener contemplated hereby has been shown, namely, the application thereof to cable structures; obviously the invention is not restricted to use in this particular field, but is capable of many other practical applications. Hence, it should be understood that the invention should be limited only by the scope of the appended claims.

The invention is hereby claimed as follows:

1. A sheet metal fastener for supporting objects in an apertured work piece comprising a plurality of elongated circumferentially disposed segments, a member interconnecting said segments at one end thereof and holding said segments in circumferential relation, said member having an aperture therein to receive a portion of the object to be supported, rigid gripping elements formed on the longitudinally extending edges of the segments at the portion thereof adjacent said member, said gripping elements extending radially inwardly and in the aggregate helically disposed, rigid surface impinging means formed on the longitudinal edges of said segments on the portion disposed toward the free end of the segments, said surface impinging means extending inwardly and being adapted to grip another portion of the object to be supported, work engaging flanges formed on the ends of said segments disposed away from said member, said flanges extending radially outwardly, shoulders formed on said segments and spaced from said flanges a distance conforming with the thickness of the work piece for which the fastener is designed, said flanges and said shoulders being adapted to engage opposite sides of the apertured work piece to mount the fastener thereon, and cam means formed on said segments and adapted to move said segments inwardly toward the object to be supported as an incident to insertion of the fastener through the aperture of the work piece whereby to urge said gripping means and said surface impinging means into firm engaging contact with the object to be supported.

2. A fastener as set forth in claim 1, wherein the cam means is integral with the shoulder and extends toward the member connecting the segments.

3. A fastener as set forth in claim 1, wherein the shoulders comprise fingers struck from the body of the segments.

4. A fastener as set forth in claim 1, wherein the segments are arcuate in transverse cross section.

OUGLJESA JULES POUPITCH.

REFERENCES CITED

The following references are of record in the file of this patent:

UNITED STATES PATENTS

| Number | Name | Date |
|---|---|---|
| 1,111,749 | Joseph | Sept. 29, 1914 |
| 1,161,155 | Pleister | Nov. 23, 1915 |
| 1,315,998 | Southgate | Sept. 16, 1919 |
| 2,244,975 | Tinnerman | June 10, 1941 |
| 2,430,809 | Flora et al. | Nov. 11, 1947 |